United States Patent [19]
Perez

[11] Patent Number: 4,928,470
[45] Date of Patent: * May 29, 1990

[54] ASSEMBLY PIECES FOR METALLIC CARPENTRY SECTIONS

[76] Inventor: Maria I. Perez, Gral. Margallo, 24, Entresuelo; Escalera 28020, Spain

[*] Notice: The portion of the term of this patent subsequent to Jan. 29, 2006 has been disclaimed.

[21] Appl. No.: 19,145

[22] Filed: Feb. 26, 1987

[30] Foreign Application Priority Data

Feb. 27, 1986 [ES] Spain ................................ 292590

[51] Int. Cl.$^5$ .................................................. E04C 2/38
[52] U.S. Cl. ........................................ 56/656; 52/280; 403/172
[58] Field of Search ................. 52/280, 656; 403/171, 403/172, 176, 295

[56] References Cited

U.S. PATENT DOCUMENTS

| | | | |
|---|---|---|---|
| 3,304,108 | 2/1967 | Hamilton et al. | 52/656 X |
| 3,716,259 | 2/1973 | Weill et al. | 52/280 |
| 4,027,987 | 6/1977 | Berkowitz | 403/172 |
| 4,105,348 | 8/1978 | Anderson et al. | 52/280 X |
| 4,222,209 | 9/1980 | Peterson | 403/295 X |
| 4,406,560 | 9/1983 | Pickering | 403/295 X |
| 4,516,376 | 5/1985 | King | 403/176 X |
| 4,544,069 | 10/1985 | Cavallini | 403/172 X |

Primary Examiner—Carl D. Friedman
Attorney, Agent, or Firm—Larson and Taylor

[57] ABSTRACT

An assembly piece for connecting metallic carpentry sections includes an angle piece having two parallel quadrants and an arced middle portion. A flat angle bar defined by two perpendicular portions is attached between the quadrants. A respective perpendicular portion extends from between the quadrants parallel to a respective side of the quadrants. Each perpendicular portion has two radially directed arms separated by a radial space opening away from the other perpendicular portion. With this construction, the two arms of each perpendicular portion are received in suitably provided radial runners of the carpentry section. Each arm also includes an aperture therein so that a screw passing through the carpentry section is received therein to hold the carpentry section to the angled piece. A flat bar extending perpendicular from one quadrant and having an aperture therein is also preferably provided in order to attach another carpentry section to the angled piece. The connecting arc of the angled piece can either have a prismatic cross section or a circular cross section.

4 Claims, 2 Drawing Sheets

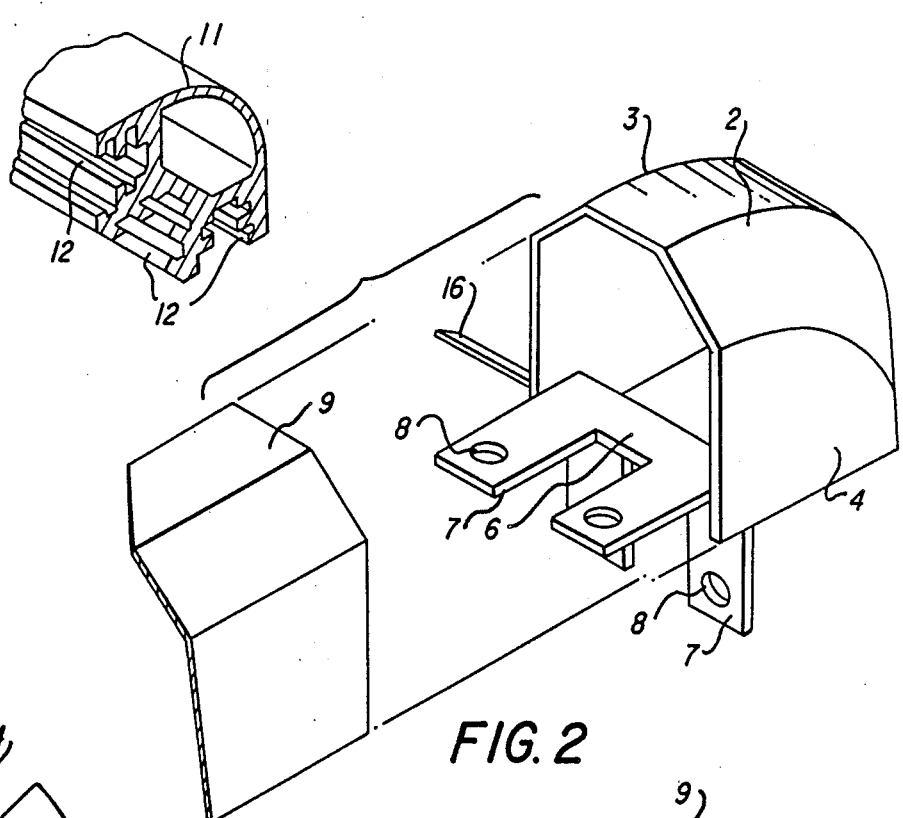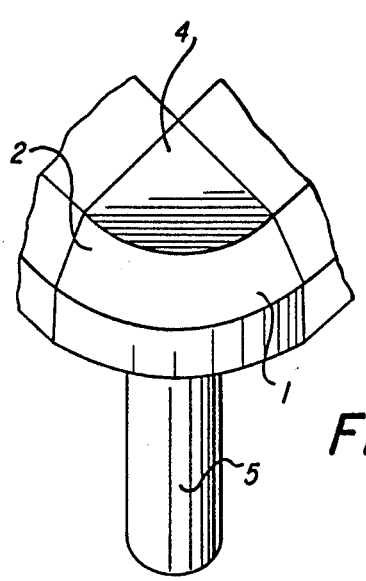

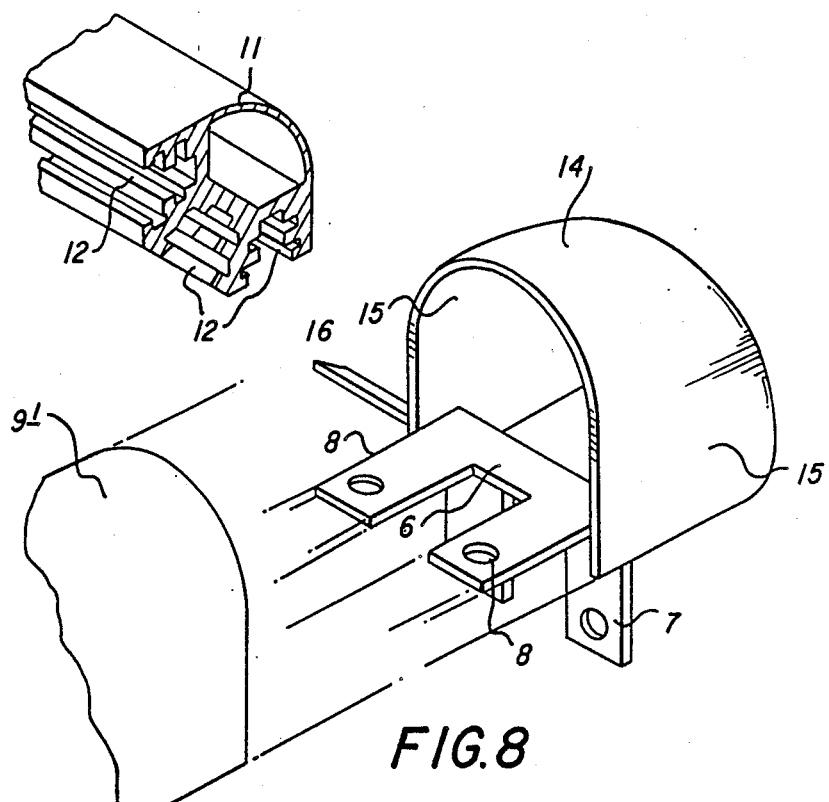
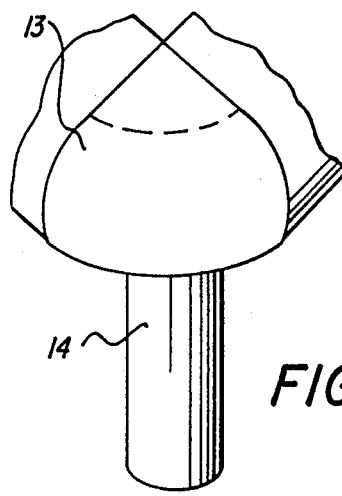
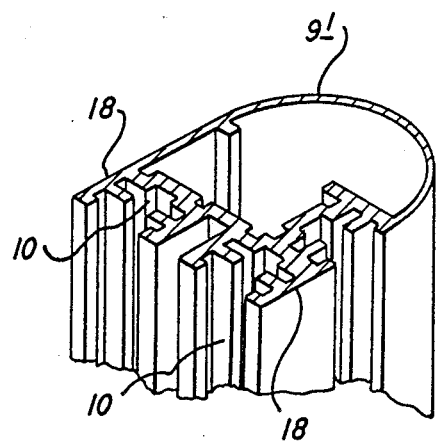
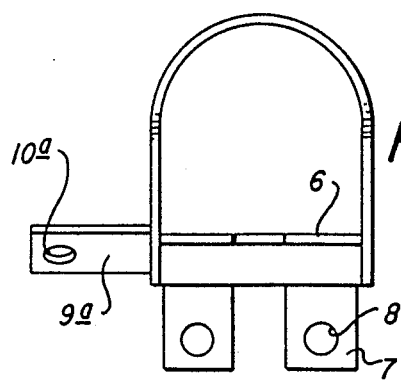
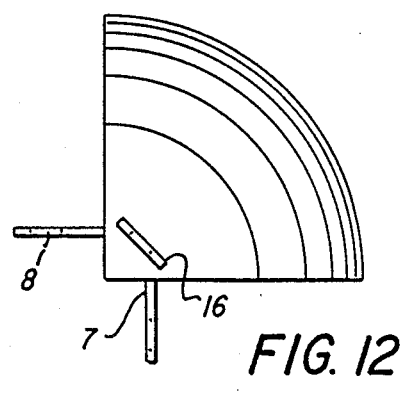

ASSEMBLY PIECES FOR METALLIC CARPENTRY SECTIONS

FIELD OF THE INVENTION

The pieces in question are used to assemble metal sections and are specially designed for shaping angles and edges.

SUMMARY OF THE INVENTION

These pieces can be used to build furniture, dividing walls or any other structure built from metal sections.

The forthcoming lists, although not exhaustive, gives an idea of the advantages to be obtained by replacing these new parts for those currently on the market:
it enables easy combination of angles made of different materials and finishes.
it allows for quick manufacturing.
it permits perfect assembly of parts.
parts can be easily replaced, since they are quickly assembled and coupled.

BRIEF DESCRIPTION OF THE DRAWINGS

In order to properly understand this report, several drawings have been attached to demonstrate a few of the many possible uses for this invention, namely:

FIG. 1 shows a prismatic edge finish.
FIG. 2 is a 90° assembly angle.
FIG. 3 is a projected section of a longitudinal bar.
FIG. 4 shows a convex finish.
FIG. 5 shows a view of the angle piece seen in FIG. 2.
FIG. 6 is an overhead view of the same.
FIG. 7 is a drawing of the angle union with a rounded convex finish.
FIG. 8 is a view of a flat angle union with a 90° convex side surface.
FIG. 9 shows an assembled longitudinal section.
FIG. 10 is the assembly section.
FIG. 11 is a section of the angle bar seen in FIG. 8.
FIG. 12 is a horizontal view of the same.

DETAILED DESCRIPTION OF THE PREFERRED EMBODIMENTS

As can be observed in the attached drawings, this model is made up of a polyhedric shaped angle piece (1) with flat sides (2) that are interjoined by edges (3) between two flat planes (4). These can be coupled by any conventional means to a cylindrical section (5) so that the latter serves as a support or union anchoring.

When the assembly is lateral, this is mounted on a flat bar (6) at a right angle so that both sides form a U shaped arm (7), each arm with an opening (8) near the free end.

These U shaped arms are fitted into two double T shaped runners (10) on the side of the longitudinal section (9) (external face).

The aforementioned arms may be held in place by screws or bolts fitted into the openings (8).

The angle section can come equipped with an extension made up of a flat bar (16) to allow for assembly onto a convex shaped section (11) (FIG. 4 or 10). This has radial runners on the inside (12) to allow for distinct combinations, determined by the placement of the flat bar (16).

The flat bar ($9_a$) has a drilled opening ($10_a$) for assembling or anchoring.

The angle piece (13) can be rounded and convex on the outside and equipped with a cylindrical support (14) which will serve as a leg.

If the angle piece were to couple a flat section, the convex line would end in two parallel right angles (15). The angle bar is fitted into this angle by any conventional means (6). The angle bar has two U shaped arms (7) with drilled openings for anchoring near the free end of the arms.

In this case, the longitudinal section ($9_1$) is curved convexly on the outside, and has U shaped runners for assembly (10) with a raised track through the middle (18).

In short, after describing the basic units of this invention, it must be emphasized that it may be manufactured in an unlimited assortment of shapes, sizes and materials for innumerable variations of use.

NOTE: After having sufficiently described the aforementioned invention, the personal, new and useful properties of the applicant are as follows:

I claim:

1. An assembly piece for connecting metallic carpentry sections having ends provided with radial runners, said assembly piece comprising:
    an angle piece having two parallel and superimposed quadrants, each said quadrant defined by diverging radial lines and a connecting arc, said angle piece further having an arced middle portion which is curved parallel to said connecting arcs and which connects said connecting arcs;
    a flat angled bar defined by two perpendicular portions, said angled bar being attached between said quadrants with a respective said perpendicular portion extending from between said quadrants parallel to a respective plane including superimposed said radial lines; each said perpendicular portion having two radially directed arms separated by a radial space opening away from the other said perpendicular portion such that the two said arms of each said perpendicular portion are received in an adjacent respective radial runner of the carpentry section, and each said arm including an aperture therein through which a screw passing through the carpentry section is received to hold the carpentry section to the angle piece.

2. An assembly piece as claimed in claim 1 and further including an outside flat bar attached to and extending perpendicular from one said quadrant and having an aperture therein such that said outside flat bar is received in a runner of another carpentry section to attach the other carpentry section to said angle piece.

3. An assembly piece as claimed in claim 1 wherein said connecting arc has a prismatic cross section between said quadrants.

4. An assembly piece as claimed in claim 1 wherein said connecting arc has a circular cross section between said quadrants.

* * * * *